United States Patent [19]

Early et al.

[11] 4,193,528

[45] Mar. 18, 1980

[54] APPARATUS FOR DELIVERY OF SOLDER

[75] Inventors: James R. Early, Rosemont, Pa.;
Donald C. Lobach, Marlton, N.J.

[73] Assignee: Campbell Soup Company, Camden, N.J.

[21] Appl. No.: 895,400

[22] Filed: Apr. 11, 1978

[51] Int. Cl.$^2$ .............................................. B23K 1/08
[52] U.S. Cl. ......................................... 228/37; 228/56
[58] Field of Search ...................... 228/37, 56, 45, 43, 228/8, 270; 266/95; 72/257, 270; 113/14 R

[56] References Cited

U.S. PATENT DOCUMENTS

| | | | |
|---|---|---|---|
| 2,224,081 | 12/1940 | Jung | 266/95 X |
| 3,000,338 | 9/1961 | Sillars | 228/8 |
| 3,190,526 | 6/1965 | Sillars et al. | 228/35 |
| 3,190,528 | 6/1965 | Sillars | 228/43 |
| 3,370,772 | 2/1968 | Sillars | 228/43 |
| 3,371,837 | 3/1968 | Sillars | 228/43 |
| 3,371,838 | 3/1968 | Sillars | 228/43 |
| 3,384,286 | 5/1968 | Sillars | 228/11 |
| 3,565,318 | 2/1971 | Sillars | 228/37 |
| 3,777,242 | 11/1973 | Fitzsimmons | 228/37 |
| 3,874,207 | 4/1975 | Lemelson | 72/270 |

*Primary Examiner*—Milton S. Mehr
*Attorney, Agent, or Firm*—Paul & Paul

[57] ABSTRACT

A solder delivery apparatus is provided for delivering molten solder to an applicator for soldering the side seams of can bodies moving in a predetermined path. The apparatus comprises an insulated housing having a unitary body portion, a specially designed crucible located in one part of the unitary body portion, a solder gate in fluid communication with the crucible positioned above the floor of the crucible, yet also providing unimpeded gravity delivery of the molten solder therefrom, heating units partially located within the unitary body portion of the housing to uniformly heat the solder gate and to maintain the molten solder therein at a substantially constant temperature throughout, and an applicator, removably mounted to the unitary body of the housing in fluid communication with the solder gate having heaters therein which maintain the molten solder at a substantially constant temperature.

14 Claims, 6 Drawing Figures

APPARATUS FOR DELIVERY OF SOLDER

BACKGROUND OF THE INVENTION

This invention relates to a novel solder delivery apparatus which may be used in conjunction with a machine for soldering can bodies. A conventional method of forming a "tin" can body is to bend a sheet of metal into a tube and interlock its edges to form a side seam or a longitudinal seam joint of interlocked layers. From the outside of the can, the body material adjacent the interlocked layers turns inwardly forming a narrow reentrant groove extending lenghtwise of the body; it is to these layers that solder must be applied to seal the joint. Typical side seamers are disclosed in U.S. Pat. Nos. 3,000,338 and 3,190,526. The usual manner of presenting cans to soldering stations is described in the above-mentioned patents and is incorporated herein by this reference.

It is an object of this invention to provide an improved solder delivery apparatus for delivering molten solder from the crucible to the applicator.

Another object of the present invention is to provide an improved solder delivery apparatus which can be used in conjunction with a machine for soldering side seams of can bodies.

A further object of the present invention is to provide a solder delivery apparatus which is adjustably supported and carried by a frame having vertical and horizontal slide adjusters to provide for precision adjustment of the crucible and related applicator nozzle position with respect to the side seams of can bodies.

A further object of the present invention is to provide such a solder delivery apparatus which maintains the molten solder at a substantially uniform temperature throughout the delivery system.

Still yet a further object of the present invention is to provide a solder delivery apparatus which in pertinent part comprises a unitary body portion, a unitary crucible and a unitary applicator working in conjunction with heating units, which substantially eliminate heat loss throughout the apparatus, and thereby eliminate uneven heating or hot spots in the molten solder preventing formation of iron oxides and the like which contaminate the solder and prevent economical and high quality soldered seams.

Still yet a further object of the present invention is to automatically control the temperature and delivery of molten solder controlling the composition of the solder and thereby substantially eliminating contamination therein and improper delivery to the side seams of cans.

SUMMARY OF THE INVENTION

Accordingly it is an object of the present invention to provide a solder delivery system which is not vulnerable to clogging, introduction of contaminants into the molten solder, and can be operated in an economical manner to produce high quality soldered side seams of can bodies.

To these ends in accordance with a feature of this invention, there is provided a solder delivery apparatus for delivering molten solder to an applicator for soldering the side seams of can bodies moving in a predetermined path, as follows.

A solder delivery apparatus for delivery of molten solder to an applicator for soldering the side seams of can bodies moving in a predetermined path comprising:

a housing having a unitary body portion having a first and second section;

first means including a crucible formed in said first section of said unitary body portion for storing molten solder and maintaining same for said delivery therefrom at a substantially constant temperature;

a solder gate in fluid communication with said crucible and located in said second section of said unitary body portion forming a channel to carry said molten solder, said solder gate having a mouth communicating with said crucible and positioned to provide unimpeded gravity delivery of said molten solder to said solder gate;

second means mounted to said housing and having a plunger for fitted communication with said mouth of said solder gate for absolute control of start-up and termination of delivery of said molten solder to said solder gate;

third means in relatively close relation with said solder gate of said second section of said unitary body portion for uniformly heating a substantial portion of said channel of said solder gate and maintaining said molten solder therein at a substantially constant temperature throughout;

fourth means located relative to said solder gate for removably mounting in seated condition said applicator to said second section of said unitary body portion and for providing a channel in fluid communication with said third means; and an applicator having a unitary body, an applicator channel therein in fluid communication with said fourth means, a precision flow matched nozzle means in fluid connection with said applicator channel for delivering a predetermined charge of molten solder to said side seams of can bodies, and fifth means located in relatively close relation with said applicator channel for uniformly heating said channel and maintaining said molten solder therein at a substantially constant temperature throughout.

Provision is also made for a unitary solder pot having two sections, a preheat sectional means for melting cold solder and a postheat sectional means for receiving preheated solder from said preheat sectional means and for delivery of said solder to said mouth of said solder gate.

Additionally, the solder delivery apparatus of the present invention further comprises seventh means having vertical and horizontal slide adjusters each with micro-adjustment stops for precision adjustment of said crucible and related applicator nozzle position, whereby said nozzle may be adjusted for proper alignment with said side seams of said can bodies.

BRIEF DESCRIPTION OF THE DRAWINGS

The above and other features of the invention including various novel details of construction and combination of parts will now be more particularly described with reference to the accompanying drawings and pointed out in the claims. It will be understood that the particular embodiment of this invention is shown by way of illustration and not by way of limitation to the present invention. The principles and features of this invention may be employed in varied and numerous embodiments without departing from the scope of the invention.

IN THE DRAWINGS

DETAILED DESCRIPTION OF THE PREFERRED EMBODIMENT

Figure 1:
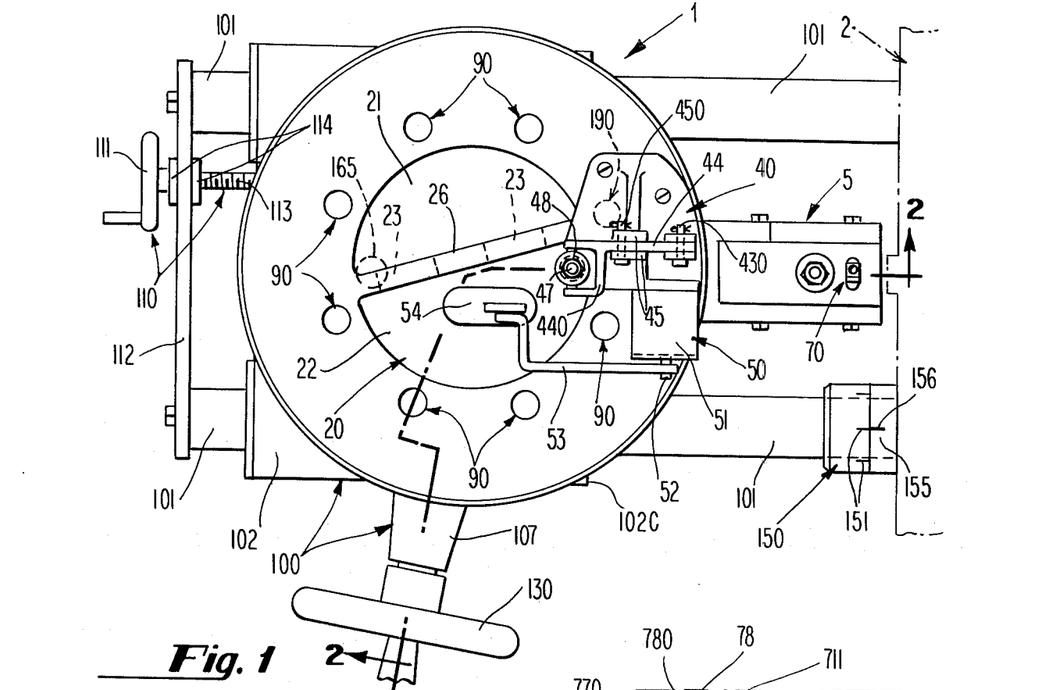
FIG. 1 is a plan view of the solder delivery apparatus of the present invention operating in conjunction with a side seamer.

Turning now to FIG. 1, solder delivery apparatus 1 is shown operating in conjunction with machine 2 for soldering side seams of can bodies. Machine 2 typically moves the can bodies (not shown) and operates in a similar manner to those referred to in the above-mentioned background patents.

Figure 2:
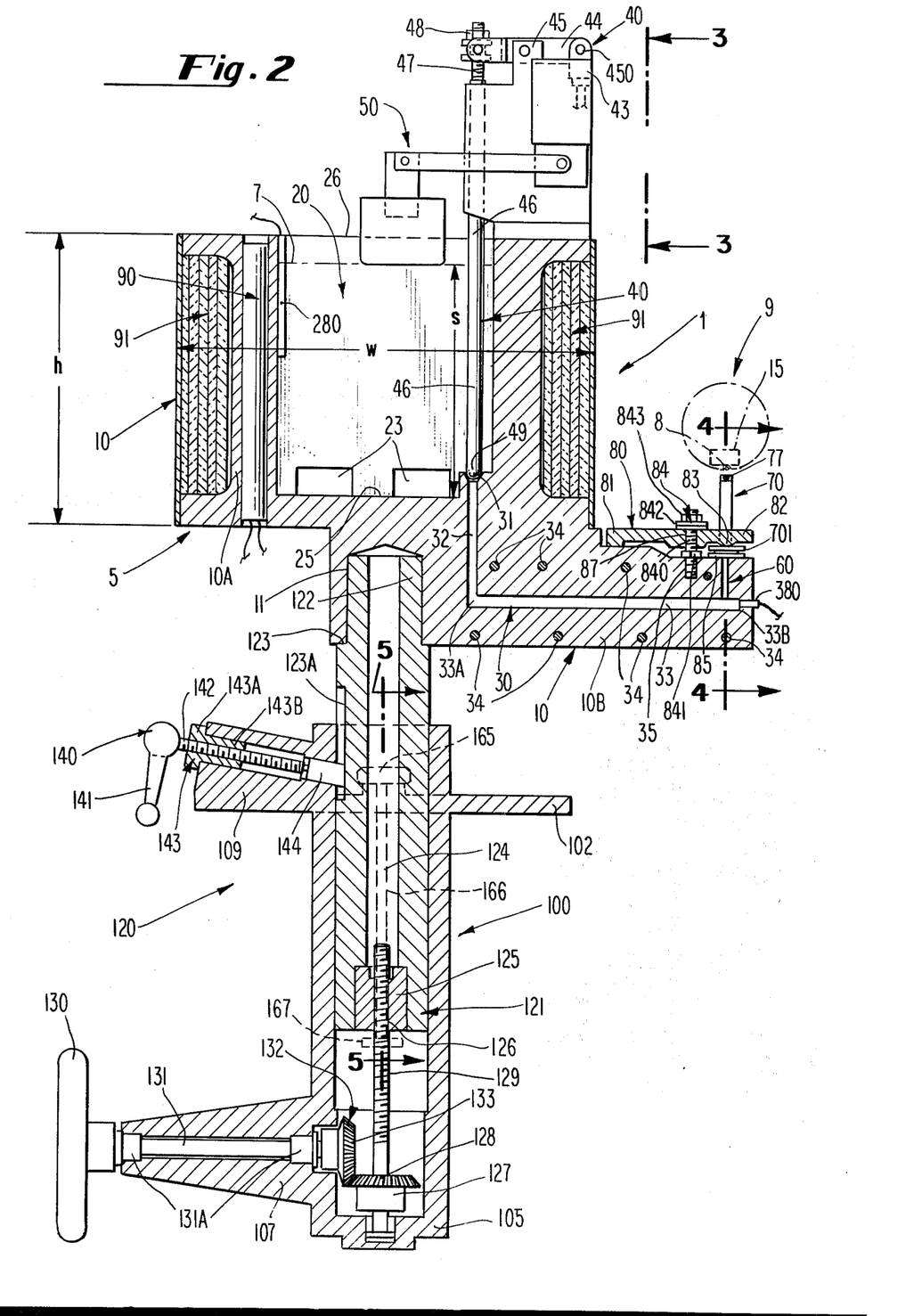
FIG. 2 is a sectional view taken along the lines 2—2 of FIG. 1.

Referring to FIG. 2 solder delivery apparatus 1 generally comprises a housing 5 having a unitary body portion 10 which in first section 10A contains a crucible 20 forming a reservoir for molten solder, and in second section 10B contains solder gate 30, which carries molten solder from crucible 20. Solder shut-off mechanism 40 operates to control delivery of molten solder from crucible 20 to solder gate 30. Float mechanism 50 measures the level 7 of molten solder in crucible 20 and automatically operates to feed cold solder or "pig", into crucible 20 for melting. Applicator feed 60 is in fluid communication with solder gate 30 the former of which is in turn in fluid communication with channel 75 of applicator 70 through bushing 85 of seating mechanism 80. The solder delivery apparatus 1 is adjustably mounted to and carried by carriage mechanism 100 which operates to control vertical and horizontal adjustment of unitary body portion 10 and therefore applicator 70 to properly position nozzle 77 relative to side seam 8 of can body 9 as illustrated in FIG. 2.

Referring now to FIGS. 1 and 2, crucible 20 comprises two sections, a preheating section 21 and a postheating section 22 each of which is connected via two ducts 23. As is best seen in FIG. 1, float mechanism 50 has an actuator unit 51 from which protrudes pivot pin 52 to which is attached generally L shaped lever 53 which is attached to float 54. Float mechanism 50 operates as is known in the art, see for example a similar mechanism in U.S. Pat. No. 3,000,338. Float mechanism 50 functions to maintain the level of solder within crucible 20 at a substantially constant height above applicator nozzle 77 thereby assuring that the molten solder is under a constant pressure and flows from orifice 78 of applicator nozzle 77.

As is described in the above-referenced patent, regarding mechanism for feeding solder into preheating section 21 a guideway having a plurality of spaced rods secured to clamping brackets is mounted on a frame. Passing between the brackets of the guideway is an endless chain mounting a plurality of spaced lugs which chain passes over sprocket wheels which are journaled in the frame and controlled by a motor. Each of the lugs are arranged to engage a hole which is bored in the endmost portion of a cold solder pig or bar of solder which is placed in the guideway and is fed downwardly into the preheat section 21 of crucible 20. The apparatus as thus far described maintains a plurality of cold solder pigs thusly mounted and in position to be successively fed into preheat section 21. Actuator 51 operates to energize the motor operating the above guideway and controls the timing of the motor so that the height of the solder within crucible 20 is maintained substantially constant. Float 54 of ceramic or other non-inflammable heat resisting material weighing less than a comparable volume of liquid solder is pivoted on lever 53 in the postheating section 22. Actuator 51 operates in conjunction with lever 53 to make and break an electric circuit and to activate and deactivate the above motor. Thus as molten solder is drawn into solder gate 30 from postheat section 22, the molten solder is drawn from preheat section 21 through ducts 23 and the height of the molten solder within crucible 20 is maintained at relatively the same height in both the preheat section 21 and postheat section 22. Since the height "S" of the molten solder in postheat section 22 is critical insofar as retaining a constant pressure head at applicator nozzle 77, to maintain such head and flow of the solder at orifice 78, float 54 operates in the postheat section 22.

In operation of float mechanism 50 as thus far described, the molten solder is drawn from postheat section 22 into solder gate 30, molten solder from preheat section 21 is transferred through ducts 23 into postheat section 22 which keeps the heighth of molten solder in both pre- and post-heat sections 21 and 22 at the same heighth. As molten solder is drawn into solder gate 30, float 54 is lowered and makes an electric circuit. Activator 51 energizes the motor to permit colder solder pigs to advance downwardly of the guideway and into preheat section 21 to be melted. The level 7 of molten solder in postheat section 22 may therefore be maintained at a height suitable for soldering and by virtue of segregating crucible 20 into pre- and post-heat sections 21 and 22, the temperature of the molten solder being drawn into solder gate 30 is more precisely controlled. Moreover, as will be described in further detail with respect to solder gate 30, mouth 31 is located above floor 25 of crucible 20 and therefore, the molten solder drawn into solder gate 30 through mouth 31 is not that solder transferred directly from preheat section 21 into postheat section 22 through ducts 23. This acts to further insure the quality of solder by preventing impurities which tend to settle to crucible floor 25, from being drawn into solder gate 30, and additionally, helps insure maintenance of substantially the same temperature of the solder being drawn from postheat section 22 of crucible 20 into solder gate 30 for delivery to applicator 70 and eventually to side seams 8 of can bodies 9.

As is best seen in FIG. 2, the solder delivery apparatus 1 of the present invention is contained in housing 5 having a unitary body portion 10. For purposes of description only, two sections of the unitary body portion are designated as first section 10 A generally housing the crucible 20 and second section 10B, which will be hereinafter designated as the extension arm 10B housing solder gate 30 and applicator feed 60. Unitary body 10 is fabricated of a single block of ductile cast iron and while such material is preferrable, any suitable material accomplishing the ends of the solder delivery apparatus 1 as hereinafter set forth with respect to maintenance of the molten solder at a substantially constant temperature throughout its delivery, will be acceptable.

In the preferred embodiment, it can be seen in FIG. 1, that eight resistance heaters 90 are placed symmetrically about crucible 20 which are in the preferred embodiment standard 650 watt resistnace heaters. From FIG. 2, it can be seen that each of the resistance heaters 90 will be placed axially of crucible 20 and extend almost throughout the entire height of unitary first section 10A of housing 5 and at least extending heighth "S" of molten solder in crucible 20 as defined from crucible floor 25 to solder level 7. Resistance heaters 90 and 95 (described more fully hereinafter) are controlled by a solid state controller which independently controls and monitors the temperature in postheat crucible section 22 via thermocouple 280 and in lateral channel 33 prior to solder feed into applicator feed 60 via thermocouple 380. The symmetrical arrangement of resistance heaters 90 insures uniform heating of and maintenance of the molten solder at a predetermined temperature by uniformly heating section-one (10A), which uniformly heats crucible 20 and the solder contained therein. Moreover, the controller and thermocouple 280 operate to make resistance heaters 90 more responsive to the temperature of the molten solder in postheat crucible section 22 for more accurate control of temperature of the molten temperature drawn into solder gate 30. Furthermore, it has been found, that by surrounding the perimeter of first-section 10A, and therefore, crucible 20 and resistance heaters 90, with insulation 91, the temperature gradient across the width "W" of first-section 10A is negligible.

It will be further understood that housing 5 substantially encloses crucible top 26 (not shown), to minimize heat loss from crucible 20. In the preferred embodiment, crucible top 26 is open and a charcoal blanket is placed on top of the molten solder in both the pre- and post-heat sections (21 and 22) to reduce heat loss. This blanket would in FIG. 2 float on top of solder level 7 and be of a thickness to correspond to the heighth represented by solder level 7 to crucible top 26. The blanket also provides a non-oxidizing atmosphere. It will also be understood that the solder pigs fed into preheat section 21 pierce the blanket and after delivery into the solder bath the blanket closes over. Also, float mechanism 50 and shut-off mechanism 40 each pierce the blanket, the former floating on the molten solder at solder level 7 the blanket closing around mechanisms 40 and 50 to minimize heat loss from top portion 26 of postheat crucible 22.

As can be seen from FIGS. 1 and 2, resistance heaters 90 are accessible and easily removable and replaceable even while solder delivery apparatus 1 is in operation.

Figure 3:
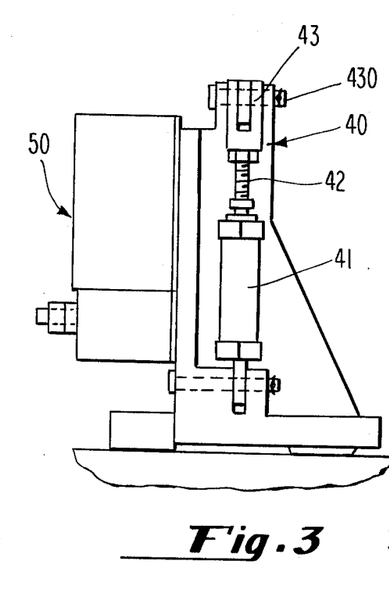
FIG. 3 is a view of the present invention taken along the lines 3—3 of FIG. 2.

Turning now to automatic shut-off mechanism 40, and with reference to FIGS. 2 and 3, it can be seen that shut-off mechanism 40 is mounted on first section 10A of housing 5 and generally comprises a pneumatic cylinder 41 integral with threaded member 42 adjustably engaging arm 43 which is secured to lever 44 (by cotter-pinned-thru-bolt 430) having "U"-shaped end portion 440 and lever 44 being pivotally secured to shut-off mechanism 40 at support member 45 (by cotter-pinned-thru-bolt 450) and with "U"-shaped end portion 440 operatively engaging plunger 46 through threaded member 47 and attaching member 48 which adjustably engages threaded member 47 for adjustably securing plunger 46 to "U"-shaped portion 440. Valve stem 46 has a self-aligning spherical end 49, for fitted communication with mouth 31 of solder gate 30. In operation of the shut-off mechanism as thus far described, controller (not shown) for shut-off mechanism 40 may be automatically activated in response to can bodies or is activated and in turn activates cylinder 41 which operates to thrust threaded member 42 either upwardly or downwardly in turn pivoting arm 44 about pivotally mounted member 45 and thereby lowering valve stem 46 into fitted communication with mouth 31 or raising valve stem 46 out of communication with mouth 31. In operation of solder delivery apparatus 1, when it becomes necessary to shut-off the flow of solder to nozzle 70, it becomes important that absolute control or shut-off be instantaneously achieved at which time controller for shut-off mechanism 40 is activated and valve stem 46 is absolutely and positively instantaneously lowered into fitted communication with mouth 31 to terminate solder flow. Since solder flow through solder gate 30 and out orifice 78 is controlled by gravity feed based upon height of molten solder measured from the base of lateral channel 33 to solder level 7, as compared with that measured from the base of lateral channel 33 to orifice 78, the instantneous shut-off of flow of molten solder from crucible 20 into solder gate 30 terminates flow of molten solder from the orifice 77 of applicator 70. The absolute control of solder flow is essential and accomplished utilizing mechanism 40 which forces the self-aligning spherical end 49 into mouth 31 with about 50 pounds of applied force.

Figure 4:
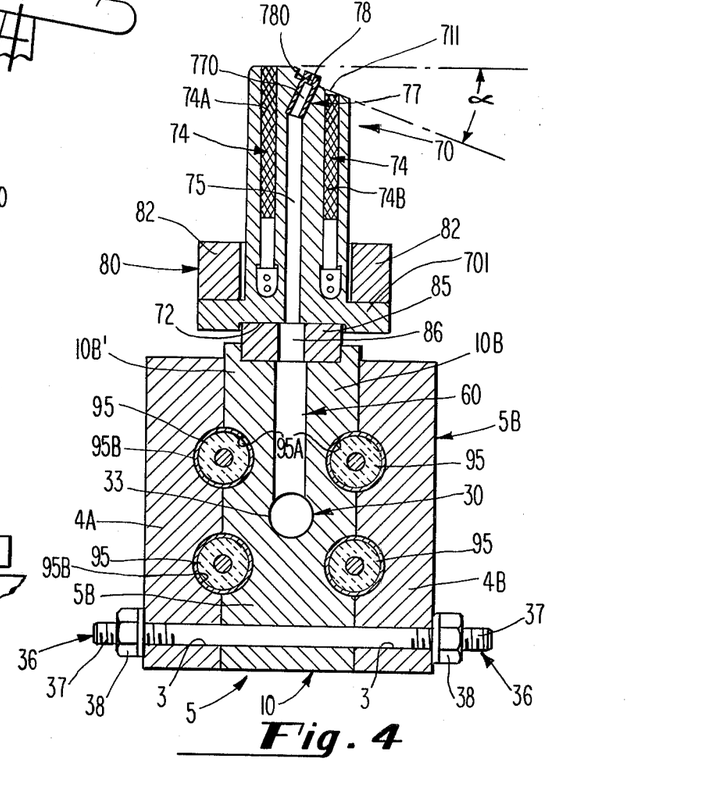
FIG. 4 is a sectional view of the applicator of the present invention taken along the lines 4—4 of FIG. 2.

Referring now to FIGS. 2 and 4, and particularly to second section 10B of unitary body 10, namely, extension arm 10B, solder gate 30 is shown having axial channel 32 in fluid communication with lateral channel 33 which runs for substantially the same length as extension arm 10B. As is best seen in FIG. 4, lateral channel 33 of solder gate 30 is shown to be in fluid communication with applicator feed 60 both of which are contained in unitary body portion 10 of extension arm 10B. As was stated before, unitary body portion 10 is, in the preferred embodiment, made of ductile iron and this one piece construction has been found to be important in helping to maintain the molten solder flowing through solder gate 30 at a substantially constant temperature as it is fed from crucible 20 into solder gate 30 and flows through axial channel 32, into lateral channel 33 and thereafter into applicator feed 60. It should also be noted that there are four heating elements 95 symmetrically arranged, in relation to lateral channel 33. In the preferred embodiment, these heaters are 500 watt resistance heaters which parallel lateral channel 33 extending along the entire length of lateral channel 33 and just past each of its two end portions 33A and 33B.

As is best seen in FIG. 4, extension arm 10B has four partially bored-out portions 95A for mating with each of the resistance heaters 95 and possesses eight bored holes 34 (FIG. 2). The housing 5 includes additional sections 4A and 4B which mate with extension arm 10B and which have four partially bored-out portions 95B to accommodate resistance heaters 95 and as with extension arm 10B have therein eight bored holes 3 which align themselves with bored holes 34 of extension arm 10B. In assembling housing 5, the resistance heaters 95 are placed into the bored-out portions 95A of extension arm 10B and housing sections 4A and 4B are mated with heaters 95 and extension arm 10B so that holes 3 and bored-out portions 95B are in alignment with holes 34 and heater 95 of extension arm 10B whereupon through-bolts 36 are inserted into bored holes 3 and 34, respectively, each of the bolts having two threaded portions 37 and each engaged with nuts 38 on each side of through-bolt 36 whereupon each of the two respective nuts 38 for each end of through-bolts 36 are tightened down upon sections 4A and 4B respectively of housing 5. In this manner, resistance heaters 95 may be easily and economically inspected and replaced, if necessary, without excessive amounts of down time of the solder delivery apparatus 1.

Applicator 70 is mounted in fluid communication with applicator feed 60 by means of bushing 85 having bored hole 86 therein and functions to orient and seal applicator 70. As can be seen from FIG. 4, upper end 10B' of extension arm 10B is machined so that bushing 85 mates with upper portion 10B'. Solder channel 86 of bushing 85 is slightly smaller in diameter than is applicator feed 60 which helps maintain molten solder at a substantially constant temperature and provide faster delivery as it passes from extension arm portion 10B through bushing 85 and into applicator 70. Applicator channel 75 is in fluid communication with bushing channel 86 and is of still yet a smaller diameter than bushing channel 86. Applicator channel 75 is in fluid communication with nozzle 77, and is of still even smaller diameter than is channel 75.

The solder delivery system of the present invention is designed to deliver the solder from the crucible 20 to nozzle 77 as fast as possible and the reduction in diameters of the various channels as discussed above functions in two ways, namely: (1) to increase the rate of flow of the molten solder; and (2) to help maintain the solder at a substantially constant temperature. It is to be noted that these functions are to some extent interrelated. Moreover, it is to be understood that heighth of molten solder measured from lateral channel 33 to solder level 7 in crucible 20 is selected in view of the design of the solder delivery channels (solder gate 30, applicator feed 60, bushing channel 86, applicator channel 75, and applicator nozzle channels 770 and 780), and is ultimately controlled to insure a uniform flow of solder from orifice 78 at a predetermined rate and pressure to insure formation of a sound solder at the side seam 8 of can bodies 9. The solid state controller operates to separately monitor thermocouples 280 and 380. The controller additionally operates to control the output of the temperature of the molten solder in postheat crucible section 22, solder gate 30, and applicator 70 by virtue of resistance heaters 90, 95 and 74. It maintains the solder at a substantially constant temperature from the point at which it is fed into solder gate 30 and through mouth 31, until delivered to side seams 8 through orifice 78. While it is to be understood that thermocouples 280 and 380 contact the molten solder to maximize control of temperature of the molten solder without interference with its flow, additional thermocouples can be placed throughout the solder delivery system and preferably in contact with the molten solder to better control its temperature.

Turning now to applicator 70, it can be seen in FIGS. 2 and 4, that applicator 70 is seated on bushing 85. In the preferred embodiment, applicator 70 has machined portion 72 to accommodate the upper portion of bushing 85. Applicator 70 is held stationary by bracket mechanism 80. Bracket mechanism 80 comprises end portion 81 which seats itself on extension arm 10B as is shown in FIG. 2, and two second-end-portions 82 having shaped portions 83 (FIG. 2) which mate with applicator flange 701. Bushing 85 operates with applicator flange 701 to properly orient and seal applicator 70 with unitary body portion 10B. Bracket mechanism 80 is secured to extension arm 10B by stud and self-aligning spherical washer assembly 84. Assembly 84 comprises threaded member 840 which engages threaded bored portion 35 of extension arm 10B. Threaded member 840 is secured to extension arm 10B by lock-nut 841 which is turned down upon threaded member 840 until it securely engages extension arm 10B. As seen in FIG. 2, a portion of threaded member 840 passes through bored portion 87 of bracket mechanism 80 whereupon self-aligning spherical washer 842 is placed over threaded portion 840 and lock-nut 843 engages threaded portion 840, and is tightened thereon so that washer 842 securely engages bracket mechanism 80. By utilizing self-aligning spherical washer 842, bracket mechanism 80 is permitted to positively secure applicator 70 through bushing 85 to extension arm 10B. Applicator 70 is thereby immovably supported and held in fixed position, yet by virtue of bracket mechanism 80, applicator 70 may be easily removed and replaced with practically no down time.

Referring now to FIG. 4, it can be seen that resistance heaters 74 are symmetrically placed in applicator 70 about applicator channel 75 and run parallel to and substantially along applicator channel 75. For ease of reference, resistance heaters 74 will be hereinafter referred to as 74A and 74B. As shown, resistance heater 74A is longer than resistance heater 74B, both 74A and 74B extending along applicator channel 75, remaining parallel thereto, and extending partially along applicator nozzle 77 to applicator top 710. While applicator 70 is generally rectangular in shape, applicator top 710 has a sloped portion 711, which, in the preferred embodiment, forms angle $\alpha$ of 20° (see FIG. 4.). Sloped portion 712 operates with nozzle 77 to deliver the molten solder at the desired trajectory for proper application to side seam 8.

Nozzle 77 comprises first channel 77 in fluid communication with application channel 75 and is sloped at 20° relative thereto (FIG. 4), has a reduced diameter in comparison therewith, and is in fluid communication with orifice channel 780 which in the preferred embodiment parallels first channel 77 and protrudes above the top of sloped portion 712 by 1/16th of an inch. By positioning orifice 78 above applicator top 710, it isolates orifice 78 from the solder overflow, build-up, and other residue, to prevent obstruction of solder flow through channel 780 and from orifice 78.

In the applicator as thus far described, molten solder is transmitted through applicator channel 75 to first nozzle channel 770 and then to orifice channel 780. Orifice channel 780, delivers the molten solder to orifice 78. Symmetrical heater 74, which in the preferred embodiment are 30 watt resistance type heaters, are regulated by the solid state controller (as described above) to uniformly heat applicator 70 and the respective channels in applicator 70 and nozzle 77 so that the molten solder is maintained at a substantially constant temperature throughout applicator 70.

As thus far described, solder delivery apparatus 1 controls the temperature of the molten solder so that it is uniformly maintained throughout the solder delivery system of the present invention. In the preferred embodiment, the solid state controller functions to maintain the molten solder at about 720° F. throughout the solder delivery system.

Nozzle 77 of the present invention, is a precision-flow-matched-nozzle, which is designed to operate to produce a consistently uniformed soldered seam in a high speed (500 cans/min.) operation. The precision-flow-matched-nozzles of the present invention are interchangeable and specifically designed for multi-machine multi-plant operation.

Nozzle 77 and solder delivery apparatus 1 are designed to emit molten solder from orifice 78 at a desired trajectory so that it interacts with side seam 8 at a relatively low height compared with that which is encountered in prior art delivery systems. This translates into less heat loss by the solder as it is delivered to side seam 8 and insures maintenance of a more uniform soldered seam and a more uniform temperature interaction with side seam 8, and therefore, a more metallurgically sound soldered seam.

Referring now to FIGS. 1 and 2, it is seen that adjustment of orifice 78 with respect to side seam 8 of can bodies 9 may be readily accomplished by carriage mechanism 100. Carriage mechanism 100 is slideably engaged with and supported by cylindrical members 101 which are integral with the frame of side seamer 2. Cylindrical members 101 support carriage mechanism 100 which is moveably attached to table 102. As is best seen in FIG. 1, mechanism 110 operates to control the horizontal movement of unitary body 10, and therefore, applicator 70. Wheel 111 is rotatably mounted with bracket 112 which is supported by cylindrical members 101. Cylindrical members 101 are in turn suported (not shown) by side seamer 2. Wheel 111 rotates axially about screw 113 which passes through bushings 114 and bracket 112 and operatively engages table 102. In operation of horizontal adjustment mechanism 110 as thus far described, wheel 111 is turned rotating screw 113 and when rotated in one direction, operates to move table 102 closer to side seamer 2 and when rotated in the opposite direction, operates to move table 102 in a direction away from side seamer 2. In the operation of mechanism 110, it is desirable to be able to precisely control movement of applicator 70, and specifically, the location of nozzle orifice 78 relative to side seam 8. It is equally important to be able to accurately reproduce or duplicate the relative positioning of orifice 78 relative to side seam 8, and therefore, horizontal micro-adjuster 150 is provided. As is best shown in FIG. 1, micro-adjuster 150 engages one of the cylindrical members 101 in relatively close proximity with side seamer 2. In the preferred embodiment, micro-adjuster 150 is in threaded engagement with cylindrical member 101. Micro-adjuster 150 is rotatable about the threads of cylindrical member 101 and moves toward and away from side seamer 2 depending on the direction of rotation. As shown in FIG. 1, adjuster 150 has been rotated, and moved toward side seamer 8 until it abuts stationary collar 155. Micro-adjuster 150 has indicia 151 marked thereon in increments of three-one-thousandths of an inch. Collar 155 has stationary indicator 156 marked thereon and in cooperation with indicia 151 of micro-adjuster 150, permits accurate and reproducible adjustments of applicator 70 relative to side seam 8 of can bodies 9.

In operation of horizontal micro-adjuster 150, as thus far described, wheel 111 is rotated to move table 102 and applicator 70 toward side seamer 2 until applicator nozzle 77 is properly positioned with respect to side seam 8. After thusly positioning applicator 70, adjuster 150 is rotated about cylindrical member 101 moving it outwardly from collar 155 until it abuts table 102 at table end-portion 102C. It will be understood that should applicator 70 be moved away from side seam 8 and side seamer 2 (and to a position as shown in FIG. 1) for maintenance, repairs, etc., that applicator 70 may be "properly positioned" as above, by rotating wheel 111 to move applicator 70 toward side seamer 2 until rotating wheel 111 cannot be further rotated, whereupon table end-portion 102C abuts adjuster 150 (not shown) precluding further advancement of applicator 70 toward side seamer 2. It will be understood that micro-adjuster 150 may be further used to more accurately align orifice 78 with side seam 8 since a first "reference position" may be recorded, and thereafter, by moving adjuster 150 away from such position by a predetermined amount by utilizing indicator 156 in conjunction with indicia 151, a second "reference position" may be established to effect a more accurate alignment of orifice 78 with side seam 8. It will also be noted that solder delivery apparatus 1 has a horizontal locking mechanism (not shown) which locks the horizontal position of table 102 on tubular members 101.

As is best shown in FIG. 2, carriage mechanism 100 also includes mechanism 120 for controlling the vertical movement of solder delivery apparatus 1. Main cylinder 121 is slideably mounted within table 102, which houses wheel 130 and lever operated screw hold down 140.

Cylinder 121 operatively engages unitary body portion 10A at cylinder uppermost portion 122. This point is selected to uniformly raise the entire housing 5 in a level manner and therefore, operates to properly raise or vertically align orifice 78 with side seam 8. As is best seen in FIG. 2, unitary body portion 10 has cylindrically bored portion 11 which receives slideable cylinder 121 in mated condition. Cylinder 121 has enlarged diameter forming shoulders 123 which operate to further stabilize and support housing 5 and the unitary body portion 10 of solder delivery apparatus 1. Slideable cylinder 121 also includes key-way 123 A which operates in conjunction with lever operated screw hold down 140. Cylinder 121 also includes a bored portion 124 running centrally therethrough and block 125, which had threaded portions 126 therein and is fixably mounted within bored portion 124. Threaded gear mechanism 127 is rotatably mounted at one end in end-portion 105 of table 102 and at the other end in threaded block 125. Wheel 130 is rotatably mounted with shaft 131, which is rotatably mounted in wheel section 107 by bushings 131A. Shaft 131 engages gear mechanism 132, having teeth 133 which are meshed with teeth 128 of threaded gear 127.

In operation of the vertical adjustment mechanism 120 as thus far described, wheel 130 is rotated in turn rotating gear 132, which rotates threaded gear 127. Threaded gear 127 further rotates vertical jack screw 129, the latter of which engages threads 126 of threaded block 125 and rotates as wheel 130 is rotated and thereby operates to move slideable cylinder 121 either upwardly or downwardly, depending upon the direction of rotation of wheel 130. Therefore, rotation of wheel 130 translates into either raising or lowering housing 5 of the solder delivery apparatus 1. After the desired vertical adjustment of carriage mechanism 100 is achieved, lever operated screw hold down 140 is activated to maintain slidable cylinder 121 in the desired position.

Lever operated screw hold down 140 comprises lever 141 which is secured to threaded screw 142 which in turn engages threaded block 143. Block 143 is generally "T"-shaped and has a top portion 143A and base portion 143B. Portion 109 of table 102 is bored to receive base portion 143 which centers threaded screw 142 in said bored portion. Portion 109 is also bored to receive hold down 144, the latter of which is engaged by threaded screw 142 and is moved inwardly or outwardly as lever 141 is rotated clockwise or counterclockwise. As lever 141 is rotated, threaded portion 142 is screwed inwardly (or outwardly) and operates in conjunction with hold down 144 which thereby frictionally engages key-way 123A of slideable cylinder 121 to prevent vertical movement of same.

Figure 5:
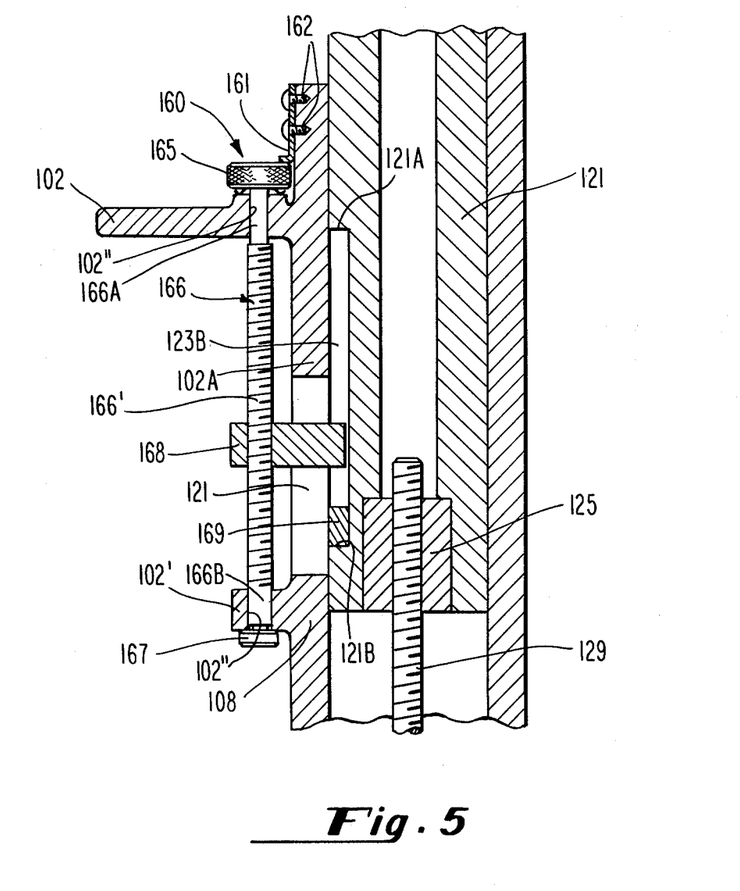
FIG. 5 is a sectional view of the vertical micro-adjuster of the present invention taken along the lines 5—5 of FIG. 2.
Figure 6:
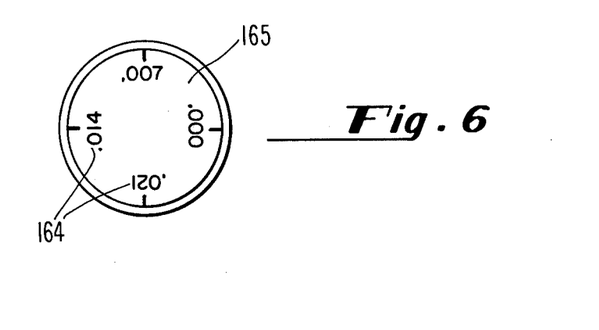
FIG. 6 is a plan view of the vertical micro-adjuster indicator of the present invention.

Vertical adjustment mechanism 120 is provided with micro-slide-adjuster 160. As is best seen in FIG. 5, adjuster 160 includes a knurled knob 165 having indicia 164 (FIG. 6) located thereon. "L"-shaped indicator 161 is mounted to table 102 by rivets 162 in fixed position to rotatable knob 165 to indicate the setting at which adjuster 160 is being maintained. Knob 165 is mounted with cylinder 166 having threaded portions 166'. Cylinder 166 has end portions 166A and 166B, which are not threaded. Cylinder 166 is rotatably mounted in and supported by shoulders 102 and 102', each having bored portions 102", which rotatably receive the respective end portions 166A and 166B of cylinder 166. Cylinder end portion 166B engages end knob 167. Threaded portions 166' engage threaded block 168 and carry same upwardly and downwardly along cylinder 166 as knob 165 is rotated and can be thusly carried upwardly along cylinder 166 until it abuts shoulder 102A or downwardly until it abuts shoulder 108. Block 168 also extends into key-way 123B, which extends upwardly to shoulder 121A and downwardly to stop 169 (the latter of which abuts against shoulder 121B).

In operation of micro-slide-adjuster 160 as thus far described, adjuster 160 is adjusted to position block 168 to abut shoulder 102A. Solder delivery apparatus 1 is then adjusted, using vertical adjustment mechanism 120, so that orifice 78 is in alignment with side seam 8 of can body 9. Knob 165 is then rotated to position block 168 to abut stop 169. The position of indicator 161 with reference to indicia 164 is then recorded. Having set micro-slide-adjuster 160, unitary body portion 10, and therefore applicator 70, may be lowered for maintenance, etc. and then be raised to the above "reference position" by rotating wheel 130 of vertical adjustment mechanism 120 until wheel 130 can no longer effect an upward movement of apparatus 1. At this point, block 168 abuts against stop 169, preventing the upward movement of slideable cylinder 121. It will be understood that micro-slide-adjuster 160 may be further used to more accurately align orifice 78 with side seam 8 since a first "reference position" may be recorded, and thereafter, based thereon a further adjustment of adjuster 160 may be made by utilizing indicator 161 in conjunction with indicia 164 to effect a more accurate alignment of orifice 78 with side seam 8. It will be also noted that lever operated screw hold down 140 may be activated or disactivated to permit such adjustment and securing of vertical adjustment mechanism 120.

It can be seen that carriage mechanism 100 may be characterized as having both vertical and horizontal slide adjusters. Moreover, each of these slide adjusters are provided with micro-adjusters 150 and 160, as described above, for reproducible precision adjustment of housing 5 and related applicator nozzle 77, to properly align orifice 78 with side seam 8 of can bodies 9.

It will be noted that apparatus 1 facilitates soldering of side seams 8 of can bodies 9 when used in conjunction with side seamer 2. Moreover, it has been found that by providing solder splash eliminator 15 to side seamer 2, that a cleaner soldered can body 9 is produced. As is seen in FIG. 2, solder splash eliminator 15 is a roller which is mounted within can body 9. In the preferred embodiment, solder splash eliminator 15 is mounted on a mandrel (not shown) which biases it against side seam 8, as shown (FIG. 2). As can bodies 9 are moved into position for soldering, solder splash eliminator 15 rolls along side seam 8 through the length of can body 9 and at the end of can body 9 and just prior to presentation of the next can body (not shown) by side seamer 2 for soldering, solder splash eliminator 15 drops downwardly toward orifice 78 (due to it being downwardly biased) and prevents any solder from entering the soldered can body 9 or the new can body (not shown) which will next be presented for soldering.

While the preferred embodiment of the present invention has been shown and described herein, it is obvious that many structural details may be changed without departing from the spirit and scope of the appended claims.

What is claimed is:

1. A solder delivery apparatus for delivery of molten solder to an applicator for soldering the side seams of can bodies moving in a predetermined path comprising:
   a one-piece housing having a unitary body portion having first and second sections;
   first means including a crucible formed in said first section of said unitary body portion for continuously melting and uniformly heating the molten solder and maintaining same for continuous delivery therefrom all in a manner which substantially eliminates the formation of hot spots and temperature gradients within said first means and said molten solder;
   a solder gate in fluid communication with said crucible and located in said second section of said unitary body portion of said one-piece housing forming a unitary channel to carry said molten solder therethrough, said solder gate having a mouth communicating with said crucible and positioned above the floor of said crucible to provide unimpeded gravity delivery of said molten solder therefrom;
   second means for uniformly heating and maintaining said molten solder within said unitary channel in a manner which substantially eliminates the formation of hot spots and temperature gradients; and
   applicator means in fluid communication with said channel for delivering a predetermined charge of molten solder to said side seams of can bodies and having third means associated therewith for uniformly heating said applicator means in a manner which substantially eliminates the formation of hot spots and temperature gradients in said applicator means and said molten solder therein.

2. A solder delivery apparatus as in claim 1, wherein said crucible comprises a unitary solder pot having two sections, a preheat sectional means for melting solder pigs and a postheat section means for receiving said solder from said preheat sectional means and for delivery of said solder to said mouth of said solder gate.

3. A solder delivery apparatus as in claim 1, wherein said second means further includes solder gate heaters arranged symmetrically of and for the length of said solder gate.

4. A solder delivery apparatus as in claim 1, wherein said applicator means further includes an applicator feed channel in fluid communication with said solder gate and wherein said third means further includes a plurality of heaters arranged symmetrically of and along said applicator feed channel.

5. A solder delivery system as in claim 3, wherein said second portion of said housing further comprises means for partially encompassing said solder gate heater and first and second housing enclosures removably mounted to and adjacent of said second portion of said housing each having means for containing a portion of said solder gate heaters in mated condition with said second portion of said housing.

6. A solder delivery apparatus as in claim 1, wherein said first means includes a plurality of heating units arranged symmetrically of and along said crucible and wherein said first means includes insulation arranged peripherally of said first means of said first portion of said housing.

7. In a machine for soldering side seams of can bodies and the like, the improvement which comprises a solder delivery apparatus as in claim 1.

8. In a machine for soldering side seams of can bodies and the like, as in claim 7, said machine presenting successive can bodies for soldering by said solder delivery apparatus, said machine further comprising splash eliminator means for continuously presenting an interacting surface with said molten solder delivered from said applicator during interim periods between when said successive can bodies are being presented for soldering.

9. A solder delivery apparatus as in claim 1, wherein said applicator means further includes bushing means for orienting and sealing said applicator with said second portion of said housing and providing a channel through which said molten solder may flow from said solder gate to said applicator, a bracket assembly engaging said applicator and said second portion of said housing and self-aligning means for self-aligning said applicator with said bracket assembly to secure same in fixed position with said bushing means and said second portion of said housing, and an applicator mateably engaging said bushing and having a channel in fluid communication with said channel of said bushing.

10. A solder delivery apparatus as in claim 9, whrein said applicator further includes a nozzle having a channel in fluid communication with said channel of said applicator but of reduced diameter as compared therewith and an oriface channel in fluid communication with said channel of said nozzle but of still further reduced diameter.

11. A solder delivery apparatus as in claim 1, wherein said applicator means further includes an applicator nozzle to deliver molten solder to said side seams of said can bodies, vertical slide adjuster means engaging said housing for moving said housing vertically and horizontal slide adjuster means communicating with said vertical slide adjuster means for supporting said vertical slide adjuster means and for moving same and said housing in a horizontally direction, said vertical and horizontal side adjuster means providing precision adjustment of and repositioning of said housing and therefore said applicator nozzle for adjustment thereof and to place same in proper alignment with said side seams of said can bodies.

12. A solder delivery apparatus as in claim 11, wherein said vertical slide adjuster means further includes a vertical cylinder slidably mounted with said horizontal slide adjuster means, and means for raising and lowering said cylinder relative to said horizontal adjuster means for raising and lowering said applicator nozzle associated with said housing.

13. A solder delivery apparatus as in claim 12 which is operatively associated with a side seamer wherein said horizontal slide adjuster means further includes a pair of horizontal cylinders, a table fitted for slidable engagement with said vertical cylinder and for slidable engagement with said horizontal cylinders, the latter of which are supported by said side seamer which in turn supports said table, and means operably associated with said horizontal cylinders and said table to move same inwardly and outwardly relative to said side seamer.

14. A solder delivery apparatus as in claim 13, wherein said horizontal and vertical slide adjuster means each further include micro-adjustment-stop mechanisms which include adjustable means for setting a predetermined position against which said horizontal and vertical cylinders abutt to preserve a predetermined position of said applicator nozzle relative to said seams of said can bodies.

* * * * *